United States Patent [19]

Kim

[11] Patent Number: 5,448,578
[45] Date of Patent: Sep. 5, 1995

[54] ELECTRICALLY ERASABLE AND PROGRAMMABLE READ ONLY MEMORY WITH AN ERROR CHECK AND CORRECTION CIRCUIT

[75] Inventor: Jin-Ki Kim, Seoul, Rep. of Korea

[73] Assignee: Samsung Electronics Co., Ltd., Suwon, Rep. of Korea

[21] Appl. No.: 38,095

[22] Filed: Mar. 30, 1993

[30] Foreign Application Priority Data

Mar. 30, 1992 [KR] Rep. of Korea ............... 5284/1992

[51] Int. Cl.⁶ .................................... H03M 13/00
[52] U.S. Cl. ................... 371/40.4; 371/40.1; 395/430
[58] Field of Search ............... 371/37.1–42, 371/10.1–10.3, 21.1

[56] References Cited

U.S. PATENT DOCUMENTS

| | | | |
|---|---|---|---|
| 3,668,632 | 6/1972 | Oldham, III | 371/37.7 |
| 4,410,988 | 10/1983 | Suelflow et al. | 371/40.1 |
| 4,672,613 | 6/1987 | Foxworthy et al. | 371/40.1 |
| 4,996,690 | 2/1991 | George et al. | 371/40.1 |
| 5,274,647 | 12/1993 | Tanaka | 371/40.1 |

FOREIGN PATENT DOCUMENTS 2-4813  7/1990  Japan .
3-18832 10/1991  Japan .

Primary Examiner—James P. Trammell
Attorney, Agent, or Firm—Charles R. Donohoe; Robert A. Westerlund, Jr.; Stephen R. Whitt

[57] ABSTRACT

An electrically erasable programmable read only memory (EEPROM), having error checking and correction circuitry uses a separation circuit to electrically isolate a temporary page buffer memory from a memory array so that better reliability of parity generation and error correction is provided. The EEPROM memory array includes a plurality of bit lines, a plurality of memory cells respectively connected to the bit lines and parity cells. The error check and correction circuit includes a column gate logic, connected to the plurality of bit lines, for temporarily loading randomly input data onto a memory page buffer. The EEPROM processes the data in the page buffer to logically store it as multi-byte data, simultaneously together with appropriate parity bit data corresponding to each multi-byte data set, in the memory array. Because data randomly input to and from the page buffer is selectively, electrically isolated from the memory array, bit errors that would otherwise be caused by defective memory cells, or bit lines, within the memory array, are compensated for in advance.

12 Claims, 7 Drawing Sheets

ELECTRICALLY ERASABLE AND PROGRAMMABLE READ ONLY MEMORY WITH AN ERROR CHECK AND CORRECTION CIRCUIT

BACKGROUND OF THE INVENTION

1. Field of the Invention

The present invention relates to a non-volatile semiconductor memory device, and more particularly an electrically erasable and programmable read only memory (EEPROM) with an error check and correction circuit.

2. Description of the Related Art

An error check and correction circuit (ECC) is generally provided with a memory device to improve its reliability since it is capable of checking and correcting defective memory cell readings.

In a memory device which includes an ECC based on Hamming code correction, error correction for a one byte field (i.e., 8 bits per field of row addressable memory) memory array, is achieved by providing 4 parity bit cells for each one byte field of data to be stored in the memory array.

Consequently, the ECC circuit parity cell array will necessarily require 50% more memory area than the same memory device without ECC. Thus, in adding ECC capability to a memory device, chip size is compromised.

With Hamming codes, error correction can also be performed on many different bit field sizes. This entails using additional parity bits in the memory array. To determine the number of parity bits needed to correct an error in a given number of data bits, the following inequality must be satisfied:

$$2^k \geq m+k+1 \qquad (a)$$

where 'm' is the given number of data bits, one of which is to be corrected, and 'k' is the number of parity bits needed for single error correction.

By taking advantage of multiple byte field memory addressing/accessing (i.e., m=16 bits (2-byte field); m=32 (4-byte field), m=64 (8-byte field; etc.), the reduced number of additional parity bits necessary, significantly decreases with increasing number of multiple bytes.

For example, from equation (a) above, it should be clear that for a 2-byte field (m=16), 5 (=K) parity bit cells are necessary. Similarly, for an 8-byte field, 7 parity bits are necessary.

A memory device employing a multiple-byte field ECC is shown in Korean Patent Publication No. 90-4831, filed by Hitachi Co., Ltd. in 1990.

In a 4-byte field, for single-error correction to be performed properly, 6 bits of parity cell bits are necessary. Thus, the extra parity bits will occupy an additional 18.8% of memory area, (i.e., 6 bits/32 bits; the 32 bits corresponding to the 4-byte data field).

Although a bigger multiple-byte field will require fewer parity bit cells per field (i.e., an 8-byte field requires 7 parity bits in addition to the 64 initial data bits [=8 bytes]; and a 4-byte field requires 6 parity bits in addition to the 32 initial data bits [=4 bytes]; etc.), bigger multiple-byte fields present an inherent drawback.

Because the number of parity bits per field (k), as a percentage of the total number of initial data bits (m), decrease with increasing field size, overall correction efficiency is diminished.

This is because, while an ECC may be capable of correcting one of 12 bits in a single-byte per field memory arrangement (8 data bits+4 parity bits), a memory arrangement with single-error correction and 4 bytes per field requires a 6-bit parity field so that one of 38 bits (32 data bits 6 parity bits) can be corrected.

Generally, because data bits are stored in a data array, while parity bits are stored in a memory array, and because both data and parity arrays consist essentially of non-volatile ROM cells, error correction is provided regardless of whether random data was simultaneously stored therein.

When an EEPROM uses a multiple-byte per field ECC, multiple bytes are generally written simultaneously to correctly generate the necessary parity bit information. As a result, data bytes in a multiple-byte field cannot be stored randomly.

Korean Patent Application No. 91-18832, filed on Oct. 25, 1991 by the present inventor, discloses a scheme for generating parity data from random memory data which is input but temporarily stored until parity generation is completed, at which time both the memory data and the parity data is stored into respective array portions.

Such a conventional multiple-byte (4-byte) per field memory device with error checking and correction (ECC) capability is shown in FIG. 1. As shown, input data through data input buffer 280 is selected by input data selector 270, 1 byte at a time. Each byte is then loaded by first column decoder 160 into page buffer 110 in response to an input address.

After 128 address transitions, 128 bytes of random input data is loaded into respective page buffers (1 byte input data being received at each address transition).

When this input data, i.e., 128 bytes—corresponding to a page, is loaded into page buffer 110 of memory array 100, a parity generation period (Tpg) is initiated.

At this point, internal column generation circuit 170 automatically generates internal column address signals, one for each of 32 (4-byte) sets of data to be loaded as a single page in memory page buffer 110.

In response to this internal column address, first column decoder 160 is enabled causing page sense amplifier 500 to read out each set (4 bytes) of data through column gate 120.

Each set of memory data read out by page sense amplifier 500 is then fed to parity generator 200, where 6 parity bits corresponding to the 4-byte set (m=32 bits) are generated.

This 6-bit parity data is loaded into a parity page buffer in a parity cell array portion (not shown) of memory array 100.

The steps associated with reading out each data set stored in page buffer 110 of memory cell array 100 and generating parity data into a corresponding parity page buffer memory location (not shown), are repeated 32 times within parity generation period Tpg to provide parity generation for each of the 32 sets stored in page buffer 110.

Thus, all of the 32 sets (1k-bits) of input data, together with corresponding 6-bit parity data associated therewith, are temporarily stored into memory page buffer 110.

During program mode, input data and parity data stored in memory page buffer 110 are respectively copied, simultaneously therefrom, to memory array 100 in selected memory cells of a memory cell array (not shown) and in selected memory cells of a parity cell array (not shown).

During read mode, first column decoder 160 responds to a selected address causing sense amplifier 210 and parity sense amplifier 400 to respectively read out a memory data set (4 bytes=32 bits) and corresponding 6-bit parity data information.

The 6-bit parity data is input to parity generator 200 which is responsible for providing the correct 6-bit parity data associated with the selected memory data set.

The parity data is then delivered to error correction decoder 230. An output signal from error correction decoder 230 is compared with memory data using an exclusive OR-gate present in corrector 220. In turn, when any one arbitrary memory data bit is found to be in error, this bit is corrected by the read parity data.

Subsequently, an output from corrector 220 is decoded by sense amplifier decoder 240 controlled by output signals YS1-YS4 from second column decoder 290.

Sense amplifier decoder 240 output is then selected by data output buffer 250 to generate a one byte data.

In a conventional EEPROM having an ECC as described above, externally input data is transferred via bit lines to page buffer 110.

When these bit lines are defective, as may result under high leakage conditions, originally input data may be distorted when loaded into page buffer 110.

Even when no data error results from loading data into page buffer 110, because data temporarily stored in page buffer 110 is read out via separate bit lines in order to generate parity data, when either these same bit lines or when memory cells connected thereto have a defect, data transferred from page buffer 110 will likely be distorted and mistakenly fed as an input to parity generator 200.

Consequently, wrong parity data, having no true parity relation to the memory data, is produced—and the corrector 220 is unable to achieve precise error correction.

Drains and gates of memory cells used in EEPROM's have applied to them high voltages (about 20 V) which subject these cells to high stress. As a result, tunnel oxides between respective gates and drains (or alternatively, gate oxides between respective gates and drains) may be destroyed.

In addition, bit lines can cause current leakage resulting from weak junctions or from residual polysilicon particles remaining from the semiconductor manufacturing process.

Although these factors may not adversely affect ECC operation in EEPROMs which employ parity data as supplied externally from the EEPROM chip, these factors take on a significant role in on-chip ECC environments where parity data is provided immediately upon a reading out of memory data from memory cells therein.

SUMMARY OF THE INVENTION

It is an object of the present invention to provide a nonvolatile semiconductor memory device with a more reliable ECC.

It is another object of the present invention to provide an EEPROM with a more reliable ECC.

It is still another object of the present invention to provide an EEPROM with an ECC that makes it possible to randomly write data in multiple-byte units.

It is further another object of the present invention to provide an EEPROM with an ECC that makes it possible to randomly write data as a multiple byte field and to produce parity data by using memory data stored temporarily in a page buffer.

According to the present invention, an EEPROM comprises a memory array which includes a plurality of bit lines, a plurality of memory cells respectively connected to the bit lines and parity cells.

The EEPROM also includes an error check and correction circuit having a column gate logic, connected to the plurality of bit lines, for temporarily loading randomly input data onto a memory page buffer.

The EEPROM then processes the data in the page buffer to logically store it as multi-byte data, simultaneously together with appropriate parity bit data corresponding to each multi-byte data set, in the memory array.

Because data randomly input to and from the page buffer is selectively, electrically isolated from the memory array, bit errors that would otherwise be caused by defective memory cells, or bit lines, within the memory array, are compensated for in advance. Thus, both EEPROM reliability and error checking and correction are significantly improved.

BRIEF DESCRIPTION OF THE DRAWINGS

For a better understanding of the invention, and to show how the same may be carried into effect, reference will now be made, by way of example, to the accompanying diagrammatic drawings, in which.

DETAILED DESCRIPTION OF THE INVENTION

Figure 2:
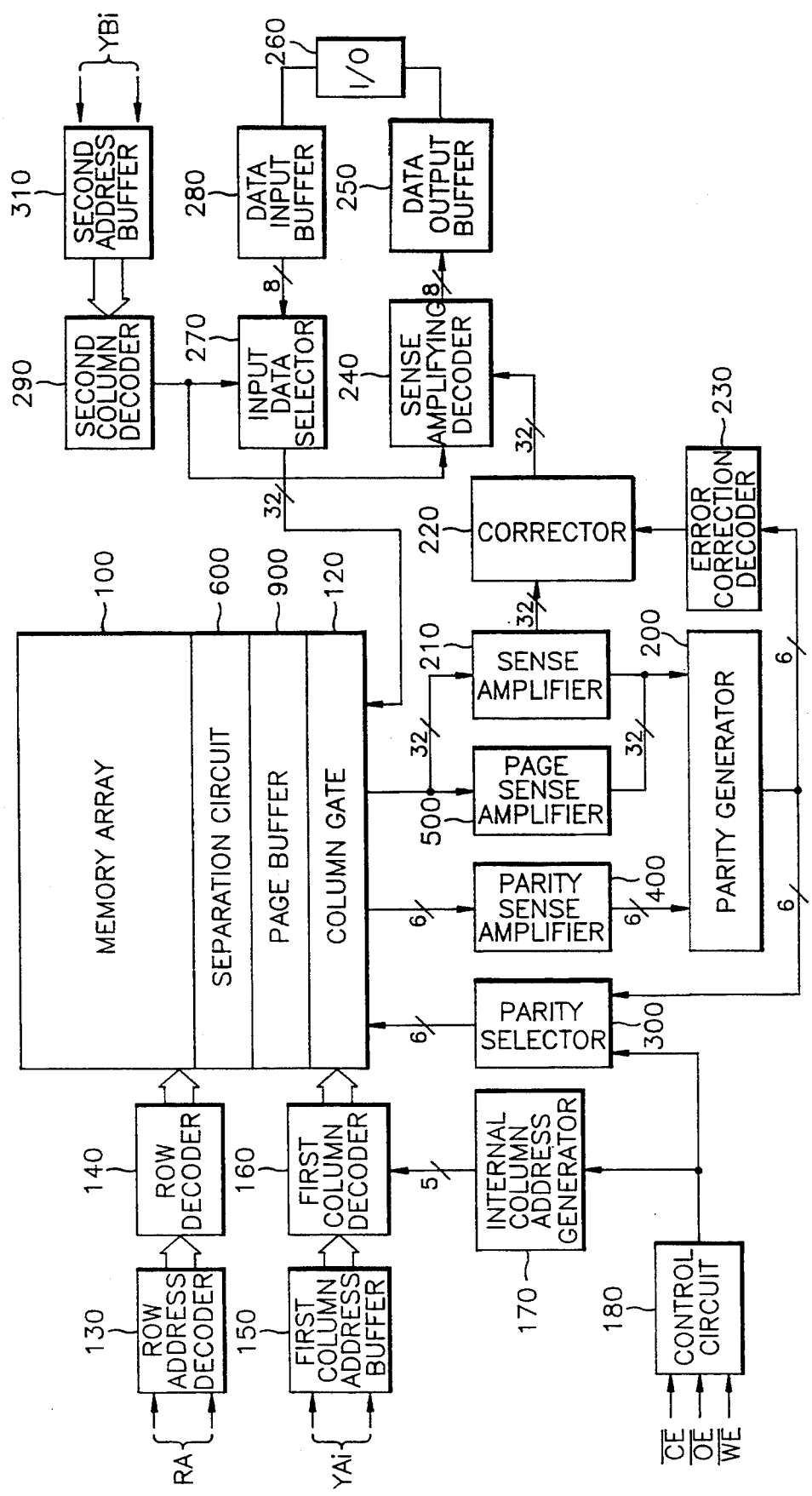
FIG. 2 is a block diagram of an EEPROM including an error check and correction circuit according to the present invention.

FIG. 2 is a block diagram schematically showing the structure of an EEPROM having an error check and correction circuit in accordance with the present invention.

Figure 1:
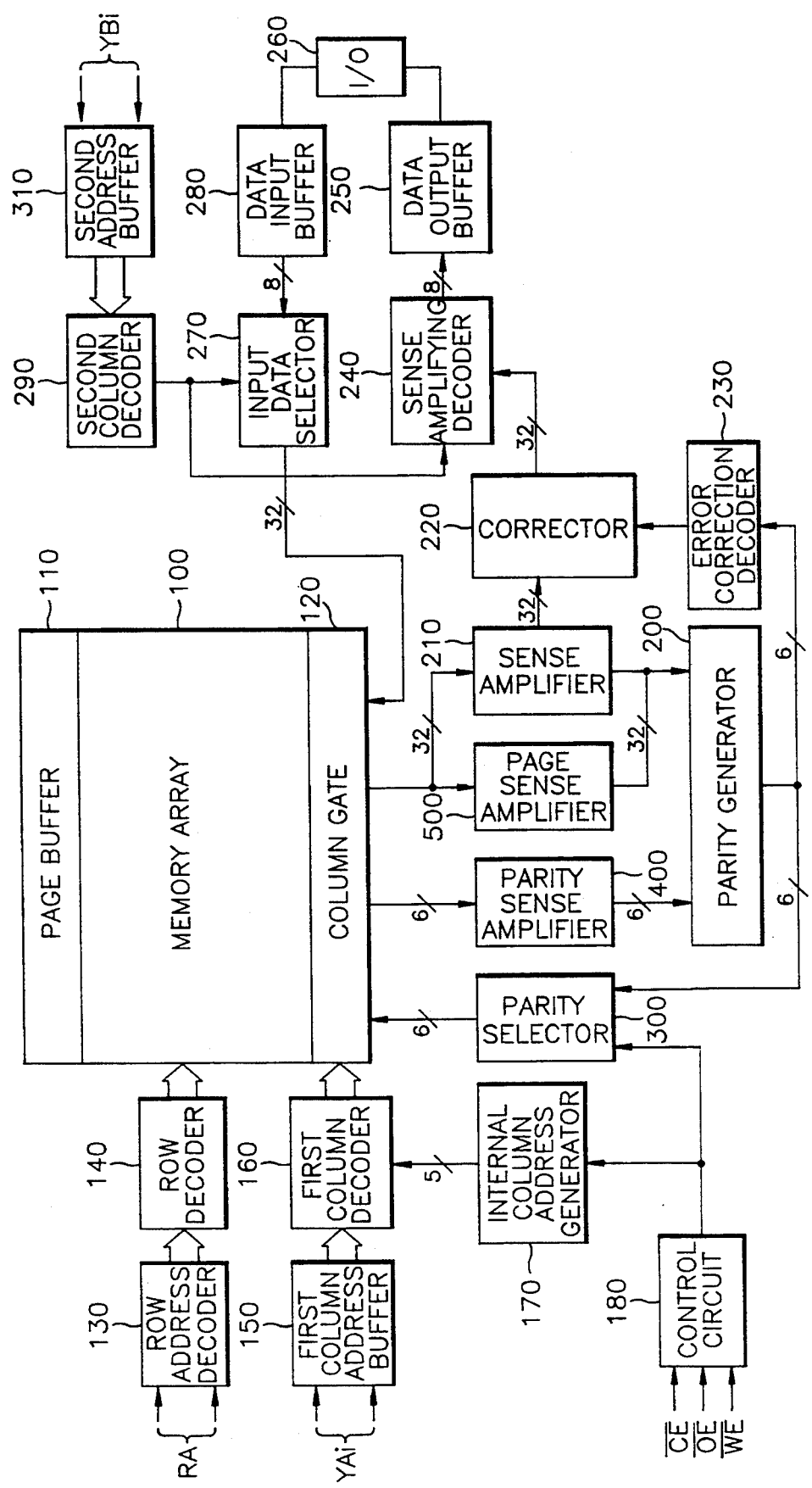
FIG. 1 is a block diagram of a conventional EEPROM including an error check and correction circuit.

The error correction scheme of the present invention is substantially similar to that of the prior art memory device shown in FIG. 1.

As illustrated in FIG. 2, the present invention uniquely arranges page buffer 900 so that it is connected between memory array 100 and column gate 120. This interconnection is very different from the conventional connection of like components presented in FIG. 1 where the page buffer is shown coupled to column gate 120 via the bit lines of memory array 100.

In the present invention, NMOS transistor separation circuit 600 is provided for electrically isolating bit lines (connected to cells within memory array 100) from page buffer 900 circuitry.

Other structural connections are substantially as shown in FIG. 1, and described in detail in Korean Patent Application No. 91-18832, incorporated herein-by-reference.

Figure 3:
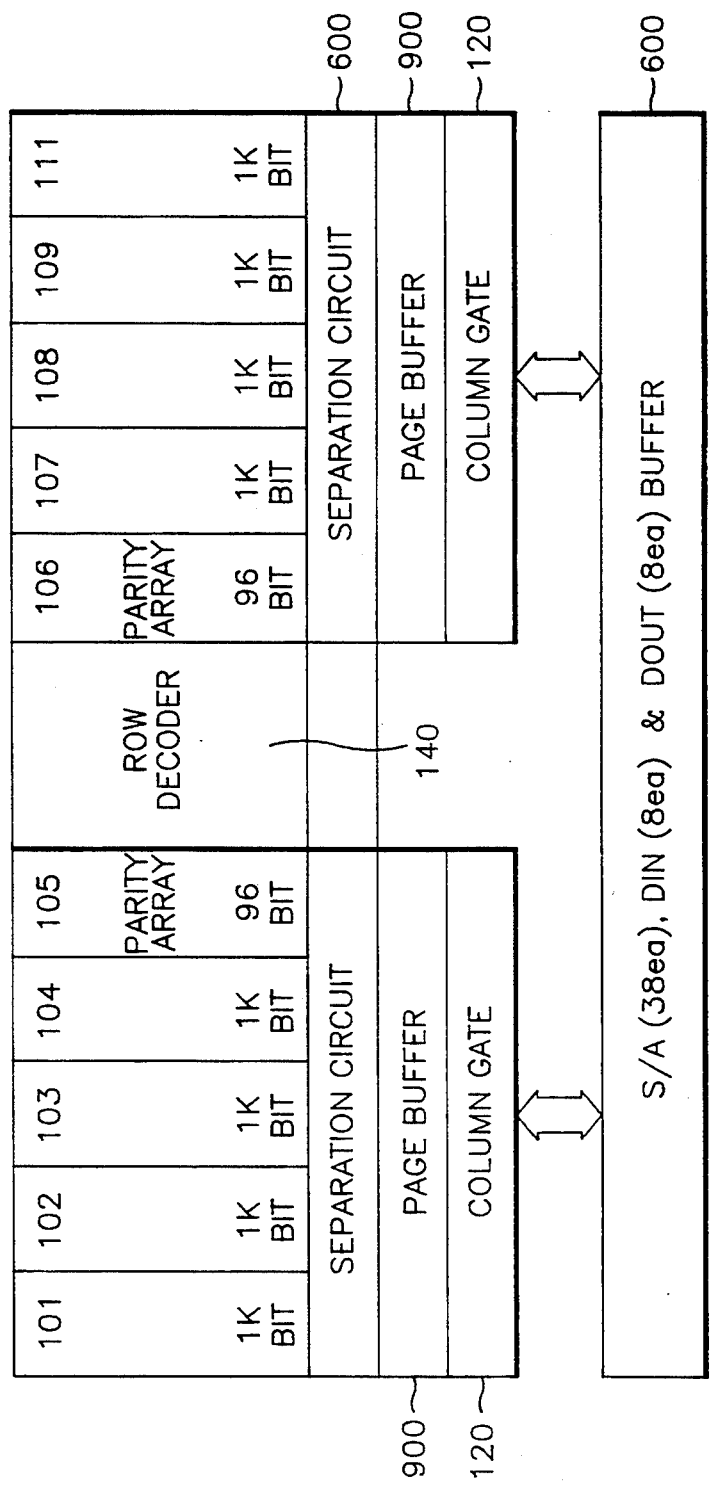
FIG. 3 is a block diagram of the internal structure of a memory array embodied in the present invention.

Memory array 100 includes a memory cell array portion (e.g., 1k-bit blocks 101–104, 107–109, 111) and a parity cell array portion (e.g., 96-bit blocks 105, 106) as shown in FIG. 3 of the present invention. The present invention also includes an error checking and correction circuit (ECC) which, in the present embodiment, is based on a 4-byte per field Hamming code scheme.

Because an input unit is 8 bits long (1 byte), when input memory data is aggregately combined to form a 32-bit (4 bytes) string set, a 6-bit parity data string is necessary, and which is combined with the 32-bit string set to yield a 38-bit string of data and parity bits.

For purposes of explanation, we will define one page as 128 bytes of memory data, and which page is further divisible into 32 sets of 4-byte fields. Each page therefore has a 1K-bit (1024 bits) capacity.

Consequently, in a memory cell array, because the number of parity data bits required for one page of memory information (128 bytes, 32 sets) is 32×6=192 bits, two 96-bit parity block arrays 105, 106 are used to store these 192 bits, as shown in FIG. 3.

Memory cell block arrays 101–104, 107–109, 111, together with the parity block arrays, constitute memory array 100.

Page buffer 900 consists of a memory page buffer portion (not shown) and a parity page buffer portion (not shown), for respectively storing thereto randomly input memory data and generated parity bits for each corresponding 4-bytes of randomly input data.

As shown in FIGS. 2 and 3, the EEPROM array structure of the present invention is uniquely arranged such that page buffer 900 is logically interposed between block arrays 101–111 and column gate 120.

Parity bit generation (6-bit parity data strings) is repeated 32 times to provide error checking and correction for a complete page of memory, i.e., 32 sets (128 bytes=4 bytes×32).

The data writing procedure according to the present invention will now be described with reference to FIG. 4, which schematically shows a circuitry for embodying page buffer 900, first column decoders 160a–160d, column gate 120, page selector 300, parity sense amplifier 400, page sense amplifier 500, input data selector 270, input data buffer 280, parity generator 200 and separation circuit 600.

Parity generator 200 generates signals S1, S2, S3, S4, S5, S6 which correspond to 6-bit parity information. As shown, 32 (4 bytes) data lines DL1–DL32 are fed to parity generator 200 to load memory data, and 6 parity lines PL1–PL6 to load parity data.

Memory cells and parity cells are selected through word lines WL and string selection lines SL. Selected bit lines, in turn, are connected to page buffer 900 under the control of bit line selection signal SBL.

In column decoders 160a, ..., 160d, signal YD makes column address signals Pi, Qi and Ri effective. Control signals $\overline{LD}$, $\overline{LCHfa}$, YW1, $\overline{LCHfd}$ are conventionally produced by control circuit 180 shown in FIG. 2.

Page buffer 900 is directly connected to column gate 120 rather than being indirectly coupled thereto (via memory array bit lines BL) as in the memory arrangement in the device of prior art FIG. 1. The inter-connection between page buffer 900 and memory array 100 bit lines is controlled by separation circuit 600, under the control of bit line separation signal YSL.

Figure 5:
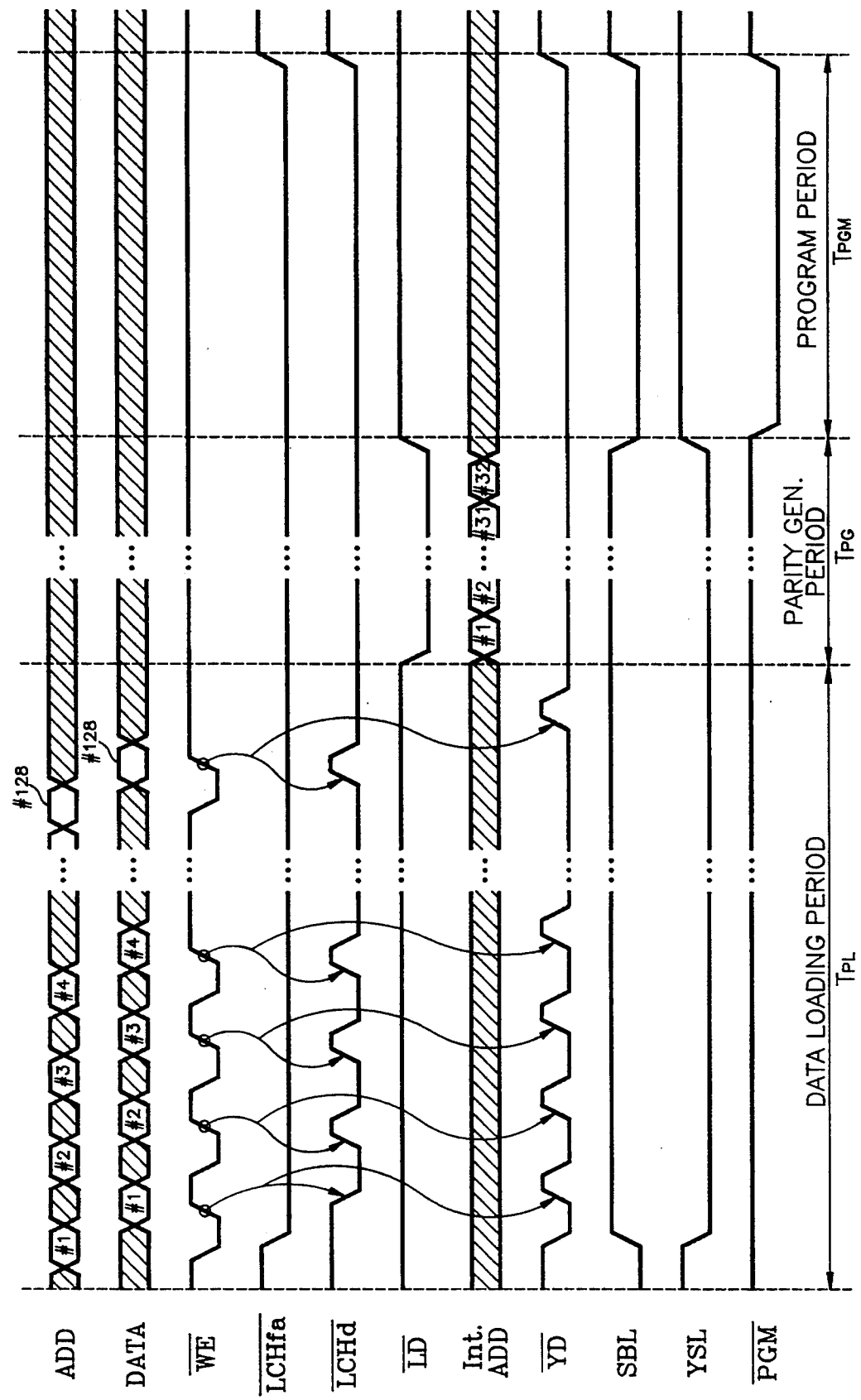
FIG. 5 is a timing diagram of the memory write operation for the EEPROM circuits shown in FIGS. 2 and 4 of the present invention.

FIG. 5 illustrates a timing chart for a memory write operation for the device of the present invention which employs an ECC. A memory write operation includes:
(i) a data loading period Td1, at which time 128 bytes (1 page) of externally input data are temporarily loaded (in accordance with a selected address) into memory page buffer 900 via column gate 120 (without travelling across memory array 100 bit lines BL);
(ii) a parity generation period Tpg, at which time parity generator 200 receives the memory data temporarily stored in page buffers 900 to generate 6-bit parity data S1–S6, each set of 6 bits corresponding to a respective one of the 32 sets of memory data (4 bytes, 32 bits)—the 6-bit parity data (32 sets) is then loaded into a parity page buffer within memory page buffer 100 via column gate 120; and
(iii) programming period Tpgm for writing the sets of 32-bit memory data and 6-bit parity data stored in the page buffer into selected memory cells in memory array 100.

More specifically, memory data is written in page form in a selected one of the 1k-bit memory array blocks 101–104, 107–109, 111, and parity data is written into corresponding parity block arrays 105 and 106 (both of which would necessarily be required to store a page-set (192 bits) of 6-bit parity data.

During data loading period Td1 and parity generation period Tpg, memory data and parity data may be transferred, via column gate 120, directly to page buffer 900, which includes both a memory page buffer for storing a page of input data, as well as a parity page buffer for storing a page of corresponding bit-parity data.

Figure 6:
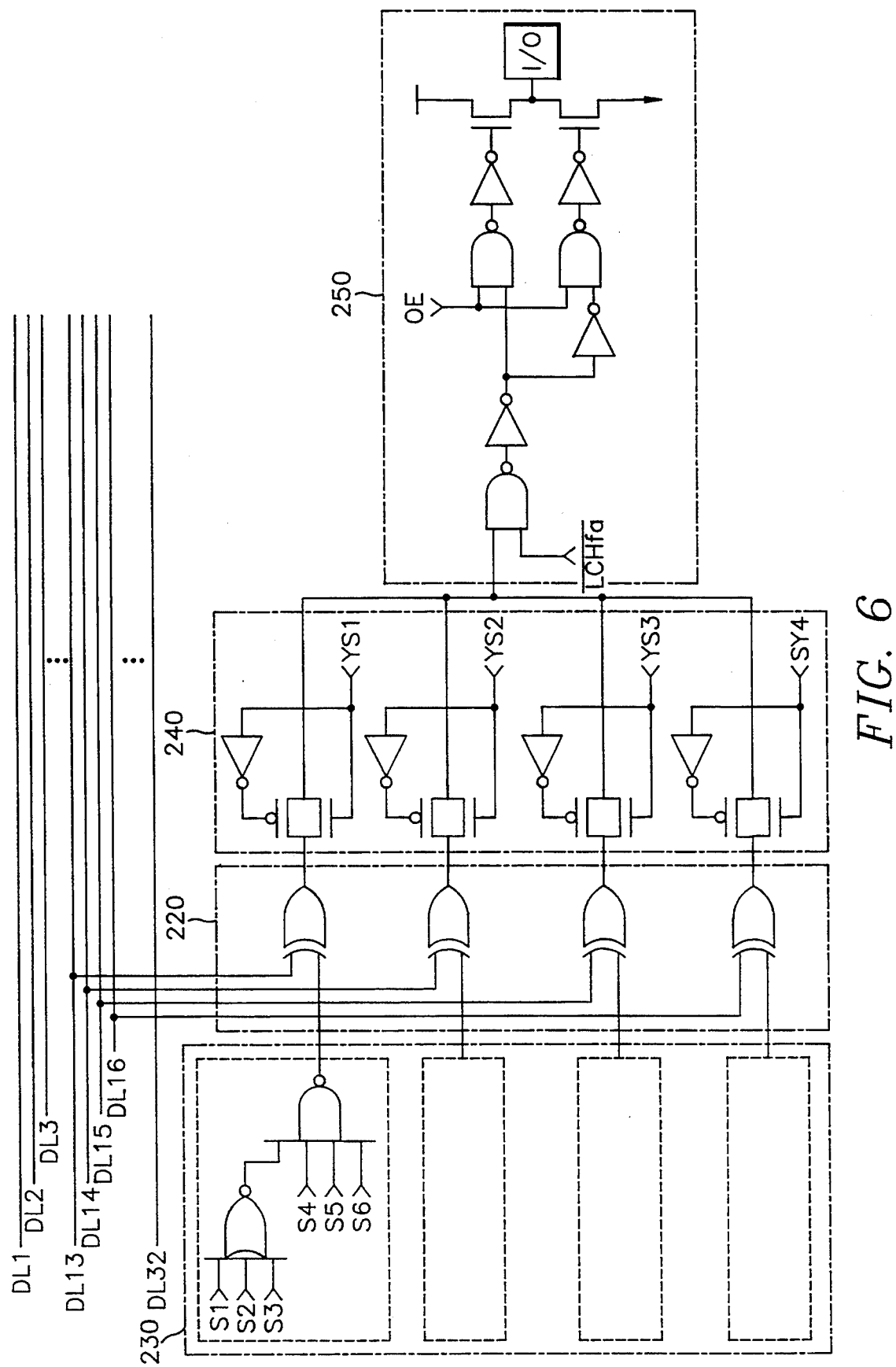
FIG. 6 is a sectional circuit diagram illustrating the significant portions of the present invention as relate to a memory read operation.

From FIG. 6, a memory read operation can be understood in relation to the sectional internal structures of the shown error correction circuitry; namely, error correction decoder 230, corrector 220, sense amplifier decoder 240, and data output buffer 250.

Figure 7:
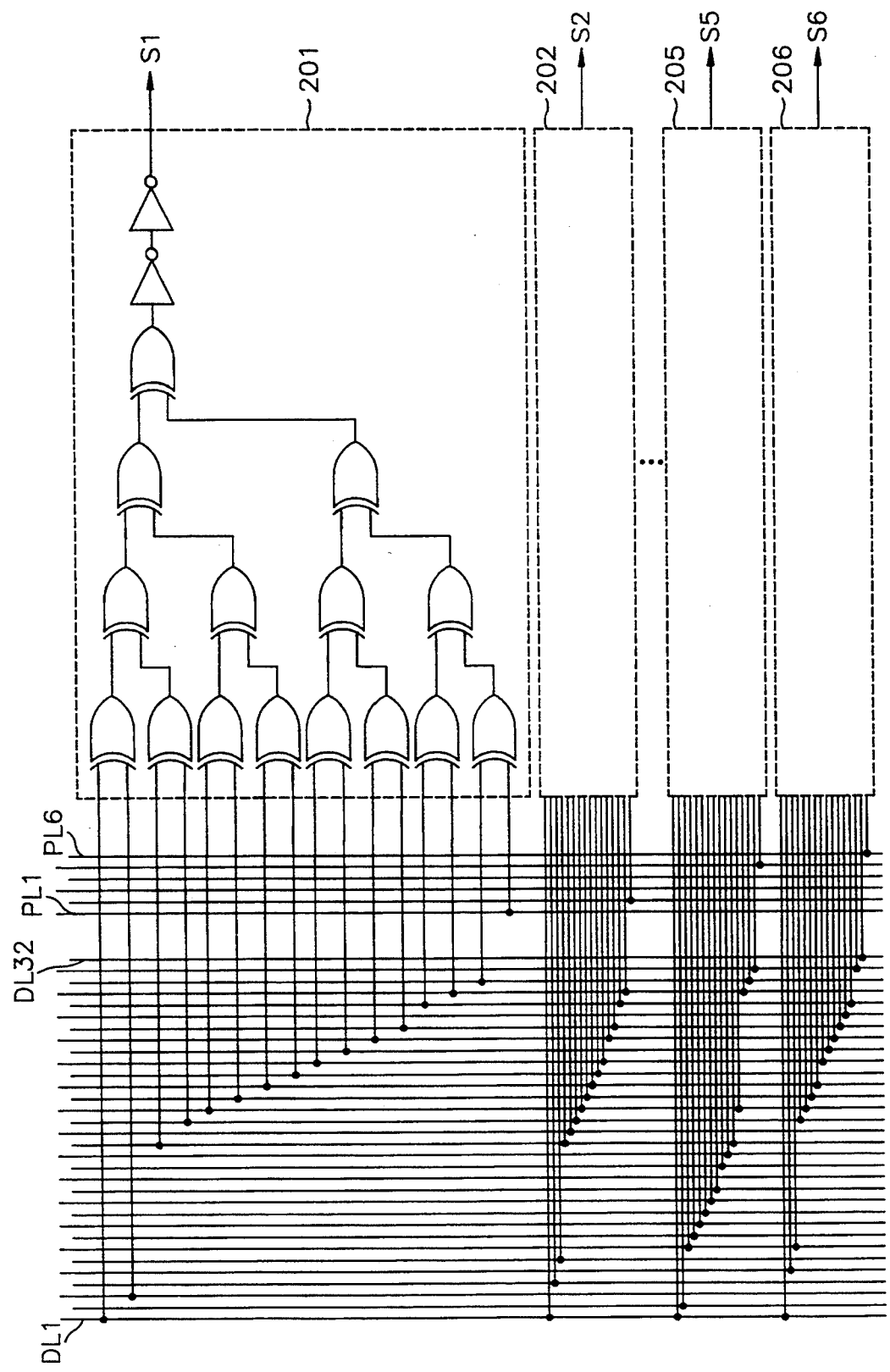
FIG. 7 is a detailed circuit diagram of the parity generator shown in FIG. 2.

Additionally, FIG. 7 shows the internal structure of parity generator 200, where the inputs of logic combination circuits 201, ..., 206 (comprising exclusive OR-gates which operate to generate respective parity bits S1, S2, S3, S4, S5, and S6) are responsive to 6-bit parity data from, for example, parity cell array 105 and 32-bit (4 byte) memory data from memory cell array 101.

Figure 4:
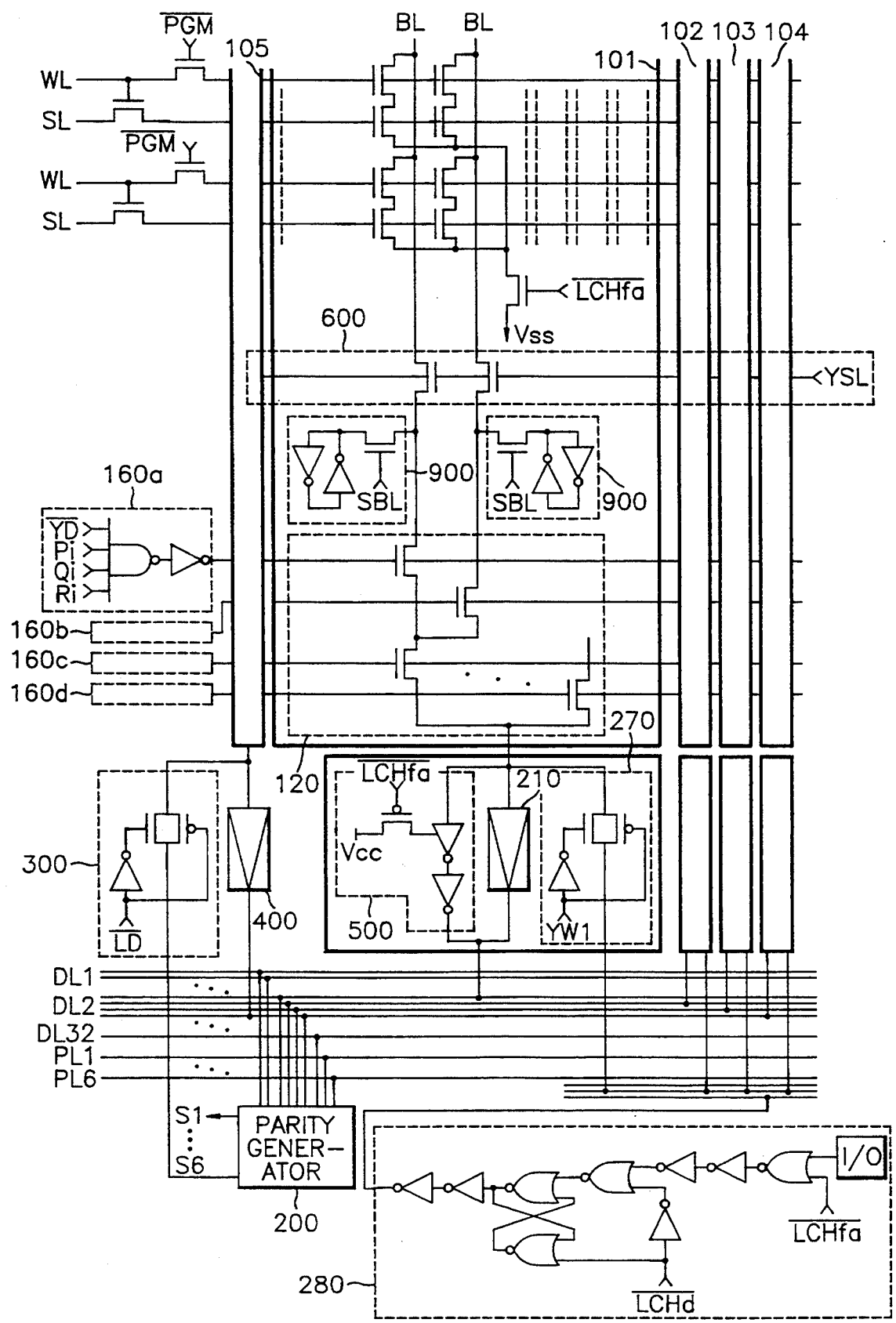
FIG. 4 is a circuit diagram illustrating the significant portions of the present invention as relate to a memory write operation.

Each set of 6-bit parity data is supplied to parity selector 300 and error correction decoder 230, as shown in FIGS. 4 and 6.

During data loading period Td1, data input via data input buffer 280 is selected, one byte at a time, by input data selector 270. A string of bytes, i.e., 4 bytes, are then loaded by first column decoder 160 into a page buffer memory location associated with an input address.

At this time, a bit line separation signal YSL is clocked logic "low" to electrically isolate the bit lines of memory array 100 and page buffer 900. As a result, 128 bytes of input data are randomly loaded into respective memory page buffer 900 memory cells. After 128 address transitions, page buffer 900 should be full; 128 bytes of input data having been completely transferred therein.

At this point in time, begins parity generation period Tpg, as shown in the timing diagram of FIG. 5.

This parity generation period begins in response to parity enable signal $\overline{LD}$ becoming logic 'low' and fed to an inverter of parity selector 300 as shown in FIG. 2.

Internal column generation circuit 170 automatically then generates a series of internal column addresses to store each generated 6-bit parity data set (corresponding to each of the 32 sets of 4-byte strings) into page buffer 900.

In turn, signal $\overline{YD}$ becomes logic "low" to enable first column decoder 160 to transmit one set of page buffer data directly after each internal address clock transition. Each set is then received by page sense amplifier 500 via column gate 120.

For data stored in page buffer 900 to be transmitted to page sense amplifier 500, bit line selection signal SBL and bit line discharge signal $\overline{DCB}$ (not shown) are respectively set to a logic "high" and a logic "low" state, respectively.

Under these conditions, errant word line operation, or signals, will not interfere with the data read operation to be performed.

Parity generator 200 then receives each set of temporarily stored memory data (4 bytes) from page sense amplifier 500 and generates 6-bit parity data strings therefor.

Each 6-bit parity data string is then loaded into a parity page buffer section of page buffer 900, each having a relative addressing order corresponding to the address of the associated memory data set also temporarily stored therein.

Repeatedly, a 6-bit parity string is generated for each memory data set transmitted to the parity generator during each internal clock address transition, until 32 6-bit parity strings have been loaded into page buffer 900.

Consequently, each 4-byte input data string together with its corresponding 6-bit parity data string can be simultaneously copied, as a single page, from page 900 into respective ones of memory page buffers 101–104, 107–109, 111 (1k-bits=128×8) and parity page buffers 105 and 106 (192 bits=6×32).

This simultaneous copying is accomplished during program period Tpgm as bit line separation signal YSL becomes high to connect addressed ones of the bit lines with page buffer 900 memory cells. Thus, 128 bytes (1k-bits; 1 page) are transferred from page buffer 900.

Because the ECC scheme of the present embodiment allows memory data and parity data to be transferred directly to and from page buffer 900 during a read operation, while maintaining random generation of parity data during a write operation, single-bit error detection is significantly improved, resulting in increased device reliability.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A semiconductor memory device provided with error check and correction circuit comprising:

a page buffer for storing a plurality of input data bytes, said input data bytes logically defining a plurality of multiple-byte sets, said page buffer including a memory page buffer portion for storing said plurality of multiple-byte sets during a data loading period, and a parity page buffer portion;

parity generation means for generating, during a parity generation period, a plurality of parity data sets in response to corresponding ones of said multiple-byte sets, and storing said generated parity data sets into said parity page buffer portion;

a memory array for storing the contents of said page buffer therein after said parity data sets have been generated; and separation means for electrically isolating said page buffer and said memory array during said data loading period and said parity generation period.

2. The semiconductor memory device of claim 1, wherein said separation means is responsive to a memory write control signal to electrically disconnect bit lines and memory cells within said memory array with shared buffer logic within said page buffer.

3. The semiconductor memory device of claim 1, wherein said memory array comprises a plurality of electrically erasable programmable read only memory (EEPROM) cells.

4. The semiconductor memory device of claim 2, wherein said memory array comprises a plurality of electrically erasable programmable read only memory (EEPROM) cells.

5. The semiconductor memory device of claim 2, wherein said separation means comprises a plurality of switching transistors, each switching transistor being responsive to said memory write control signal to electrically disconnect a bit line in said memory array from corresponding shared buffer logic within said page buffer.

6. A semiconductor memory device provided with error check and correction circuit comprising:

a page buffer for storing input data bytes during a data loading period;

parity generation means for generating parity data corresponding to said input data bytes during a parity generation period;

means for storing said parity data;

a memory array for storing the contents of said page buffer and said parity data; and separation means for electrically isolating said page buffer and said memory array during said data loading period and said parity generation period.

7. The semiconductor memory device of claim 6, wherein said separation means is responsive to a memory write control signal to electrically disconnect bit lines and memory cells within said memory array with shared buffer logic within said page buffer.

8. The semiconductor memory device of claim 6, wherein said memory array comprises a plurality of electrically erasable programmable read only memory (EEPROM) cells.

9. The semiconductor memory device of claim 7, wherein said memory array comprises a plurality of electrically erasable programmable read only memory (EEPROM) cells.

10. The semiconductor memory device of claim 7, wherein said separation means comprises a plurality of switching transistors, each switching transistor being responsive to said memory write control signal to electrically disconnect a bit line in said memory array from corresponding shared buffer logic within said page buffer.

11. A method for providing error checking and correction in a semiconductor memory device, comprising the steps of:

electrically isolating a plurality of bit lines within a memory array from within a page buffer;

storing a plurality of input data bytes into said page buffer after electrical isolation thereof from the memory array, said input data bytes logically defining a plurality of multiple-byte sets, said page buffer including a memory page buffer portion for storing said plurality of multiple-byte sets, and a parity page buffer portion;

generating a plurality of parity data sets in response to corresponding ones of said multiple-byte sets;

storing said generated parity data sets into said parity page buffer portion;

electrically connecting said page buffer and said memory array after said page of parity data sets have been generated; and storing the contents of said page buffer into said memory array after electrical connection thereof.

12. A method for providing error checking and correction in a semiconductor memory device, comprising the steps of:

electrically isolating a plurality of bit lines within a memory array from a page buffer;

storing input data bytes into said page buffer;

generating a plurality of parity data corresponding to said input data bytes;

electrically connecting said page buffer and said memory array; and loading said parity data and said input data bytes into said memory array.

* * * * *